United States Patent
Zhang et al.

(10) Patent No.: US 10,224,708 B2
(45) Date of Patent: Mar. 5, 2019

(54) OVER-TEMPERATURE PROTECTION SYSTEM OF A CHARGING DEVICE

(71) Applicant: Jiangyin SINBON Electronics Co., Ltd., Jiangyin (CN)

(72) Inventors: Xue-Feng Zhang, Jiangyin (CN); Hai-Yun Du, Jiangyin (CN); Dong-Jiang Li, Jiangyin (CN); Ya-Jun Liu, Jiangyin (CN); Jing-Jun Gu, Jiangyin (CN)

(73) Assignee: JIANGYIN SINBON ELECTRONICS CO., LTD., Jiangyin (CN)

( * ) Notice: Subject to any disclaimer, the term of this patent is extended or adjusted under 35 U.S.C. 154(b) by 65 days.

(21) Appl. No.: 15/659,498

(22) Filed: Jul. 25, 2017

(65) Prior Publication Data
US 2018/0323606 A1 Nov. 8, 2018

(30) Foreign Application Priority Data
May 3, 2017 (CN) .......................... 2017 1 0305270

(51) Int. Cl.
*H02J 7/00* (2006.01)
*H02H 5/04* (2006.01)
*H02J 7/04* (2006.01)
*H02M 1/32* (2007.01)

(52) U.S. Cl.
CPC ............ *H02H 5/047* (2013.01); *H02H 5/043* (2013.01); *H02J 7/0031* (2013.01); *H02J 7/0047* (2013.01); *H02J 7/047* (2013.01); *H02M 1/32* (2013.01); *H02J 2007/005* (2013.01); *H02M 2001/327* (2013.01)

(58) Field of Classification Search
CPC ....... H02H 5/043; H02H 5/047; H02J 7/0031; H02J 7/0047; H02J 7/047; H02M 1/32
USPC .................................................. 320/107, 109
See application file for complete search history.

(56) References Cited

U.S. PATENT DOCUMENTS

| | | | |
|---|---|---|---|
| 2009/0316321 A1* | 12/2009 | Ouwerkerk | ............ H02H 5/046 361/106 |
| 2015/0028019 A1* | 1/2015 | Kamachi | .............. B60H 1/2218 219/484 |

* cited by examiner

*Primary Examiner* — Zixuan Zhou
(74) *Attorney, Agent, or Firm* — Marshall A. Lerner; Marvin H. Kleinberg; Kleinberg & Lerner, LLP

(57) ABSTRACT

An over-temperature protection system has a control board mounted in a charging device and a temperature sensor mounted in a charging plug. A switch is coupled on a power circuit of the charging plug and controlled by the control board. When the charging plug is connected to a power supply and the charging device begins a charging operation, the control board periodically receives temperature information of the charging plug sensed by the temperature sensor. When the control board determines that the temperature of the charging plug is abnormal, the switch is open to interrupt the power circuit so as to stop the charging operation for ensuring safety of the charging device.

13 Claims, 3 Drawing Sheets

US 10,224,708 B2

OVER-TEMPERATURE PROTECTION SYSTEM OF A CHARGING DEVICE

BACKGROUND OF THE INVENTION

1. Field of the Invention

The present invention relates to an over-temperature protection system, especially an over-temperature protection system of a charging device.

2. Description of the Prior Arts

Energy saving and emission reduction are receiving increasing attention with the impact on the earth's atmosphere caused by carbon dioxide emissions leading to greenhouse effect and other abnormal climate changes. Reducing the carbon dioxide emissions in order to ameliorate climate change has especially become the primary policy for every government all over the world and is strongly advocated by the governments. Therefore the automobile manufacturers have developed the electric vehicles that are making vehicles cleaner, more fuel efficient, and reduce the carbon dioxide emissions for responding to the governmental policy. And the electric vehicles have become one of the top choices of the drivers for reducing the fuel expense.

A conventional charging system of an Electric Vehicle comprises a charging device and a charging plug connected to a power supply. A charging gun of the charging system is connected to the Electric Vehicle with the charging device and the power supply transmits power from the charging plug to the charging device via a cable in order to charge, wherein the charging device is a common charging station. The charging station is internally installed with a fuse or a fusible cutout. The fuse or the fusible cutout will melt or cut out when charging fault occurs in order to shut down the circuit to protect the Electric Vehicle. However, when the charging fault occurs, the charging plug and the cable inside will be softened and deformed by high temperature or even broken and burnt. Thus the conventional charging system needs to be improved.

SUMMARY OF THE INVENTION

An objective of the present invention is to provide an over-temperature protection system of a charging device to sense a variation of the temperature of a charging plug. When the temperature of the charging plug is abnormal, a power circuit is interrupted to stop charging. Therefore, the damage of the charging plug caused by abnormal temperature is avoided.

To achieve the objective, the over-temperature protection system comprises: a temperature sensor adapted to be mounted in a charging plug to sense a temperature of the charging plug; a switch connected to a power circuit between the charging plug and the charging device, wherein power from the charging plug is transmitted to the charging device through the power circuit; and a control board mounted in the charging device, the control board connected to the temperature sensor and receiving the temperature sensed by the temperature sensor, and the control board connected to the switch and controlling the switch to be open or closed.

When the charging device starts a charging operation, the control board periodically receives the temperature sensed by the temperature sensor to record an initial temperature of the charging plug, and then receives subsequent temperatures sensed by the temperature sensor at regular intervals to record a plurality of immediate temperatures.

The control board compares the initial temperature and the subsequent temperature. When the variation of the temperature of the charging plug in a unit of time is greater than a threshold, the switch is controlled to be open.

DETAILED DESCRIPTION OF THE INVENTION

Figure 1:
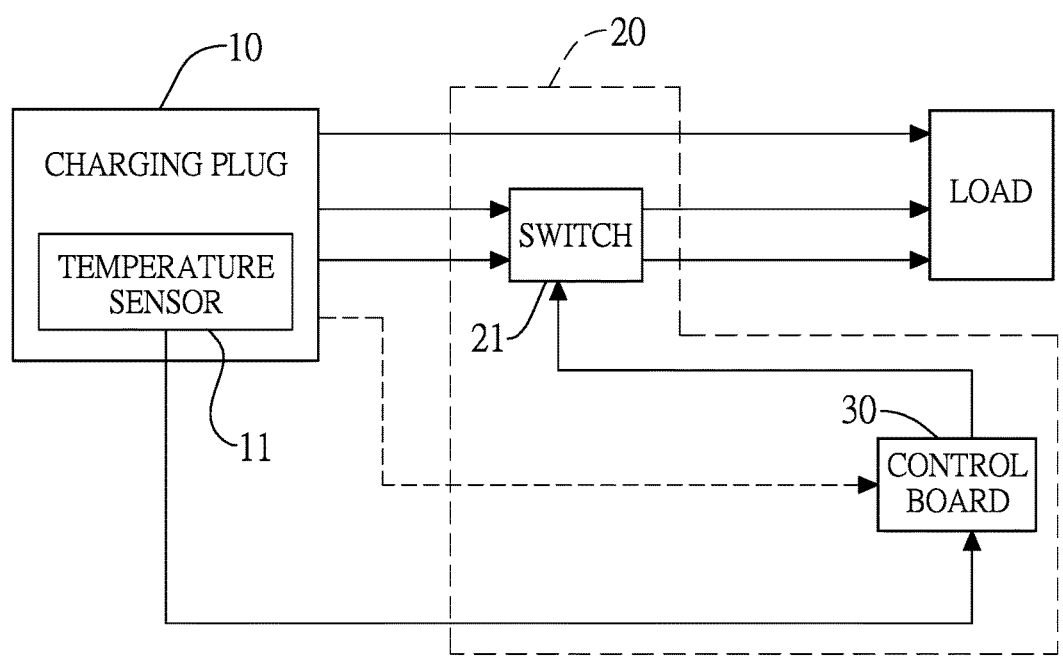
FIG. 1 is a block diagram of the present invention.

With reference to FIG. 1, an over-temperature protection system comprises a temperature sensor 11, a switch 21 and a control board 30.

Figure 2A:
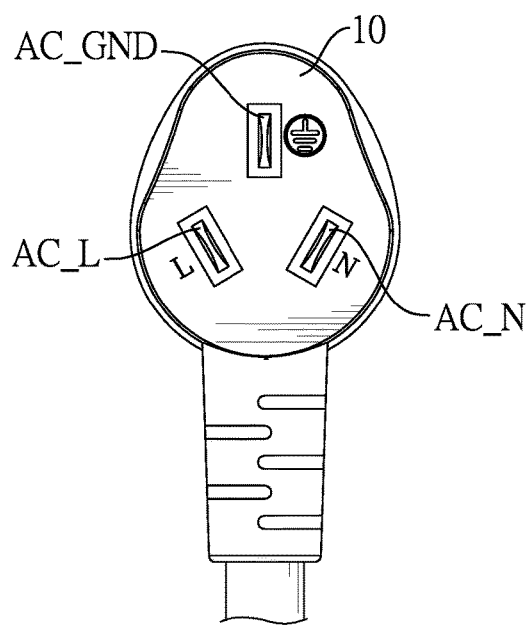
FIG. 2A is a plane view of a charging plug of the present invention.
Figure 2B:
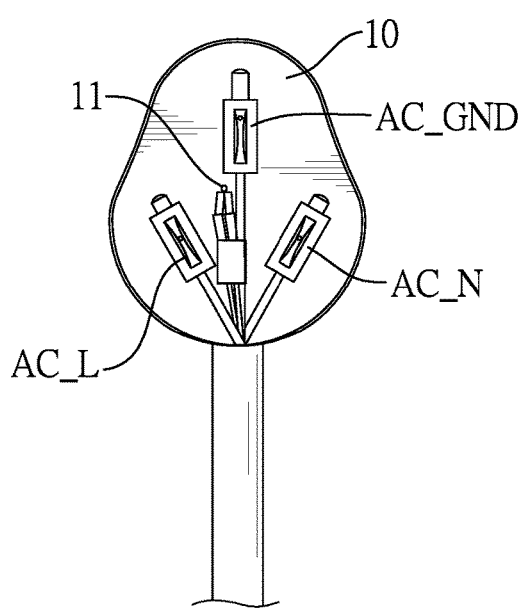
FIG. 2B is a cross view of the charging plug of the present invention.

The temperature sensor 11 is mounted in a charging plug 10 connected to a charging device 20 that gets power through a power circuit. With reference to FIGS. 2A and 2B, the charging plug 10 is an alternating current (AC) plug. In this embodiment, the charging plug 10 is a three-phase plug having three pins, AC_GND, AC_L and AC_N. In this embodiment, the temperature sensor 11 may be a thermistor and coupled between the AC_L and the AC_N. In one embodiment, the temperature sensor 11 is mounted in the charging plug 10 by injection molding technique.

The switch 21 is connected to the power circuit between the charging plug 10 and the charging device 20 to control the conduction of the power circuit. In this embodiment the switch 21 is a relay having two contacts and a control terminal. The control terminal is connected to the control board 30 to control the switching of the two contacts. The two contacts are respectively connected to the pins AC_L and AC_N of the charging plug 10. When the relay is closed, the charging device 20 receives power from the charging plug 10 through the power circuit for charging a load. Otherwise, when the relay is open, the power circuit is interrupted so that the charging device 20 stops charging.

The control board 30 mounted in the charging device 20 is connected to the temperature sensor 11 in the charging plug 10 to periodically receive temperature information sensed by the temperature sensor 11 and to determine whether the temperature in the charging plug 10 is abnormal or not. When the temperature of the charging plug 10 is abnormal, the control board 30 interrupts the switch 21 to stop the charging device 20. When the control board 30 determines that the temperature of the charging plug 10 returns to normal, the switch 21 is closed by the control board 30.

In one embodiment, the control board 30 records an initial temperature of the charging plug 10 after the charging plug 10 is connected to power and then records subsequent temperature information sensed by the temperature sensor 11 at regular intervals. In this embodiment, the time interval is 20 ms. Therefore, the control board 30 periodically receives the temperature information from the temperature sensor 11.

There are two ways for determining whether the temperature of the charging plug 10 is abnormal or not. One way is to analyze the temperature information received by the control board 30, when the temperature information shows the temperature of the charging plug 10 exceeds a critical value, for instance 80° C., it means that the internal temperature is abnormal and the switch 21 should be open. The other way is to analyze the variation of the temperature in a unit of time, if the variation exceeds a threshold, it means the internal temperature is abnormal and the switch 21 should be open. In a feasible embodiment, the unit of time is one hour and the threshold for determining variation of temperature may be any value selected from a range of 16 to 25° C.

Figure 3:
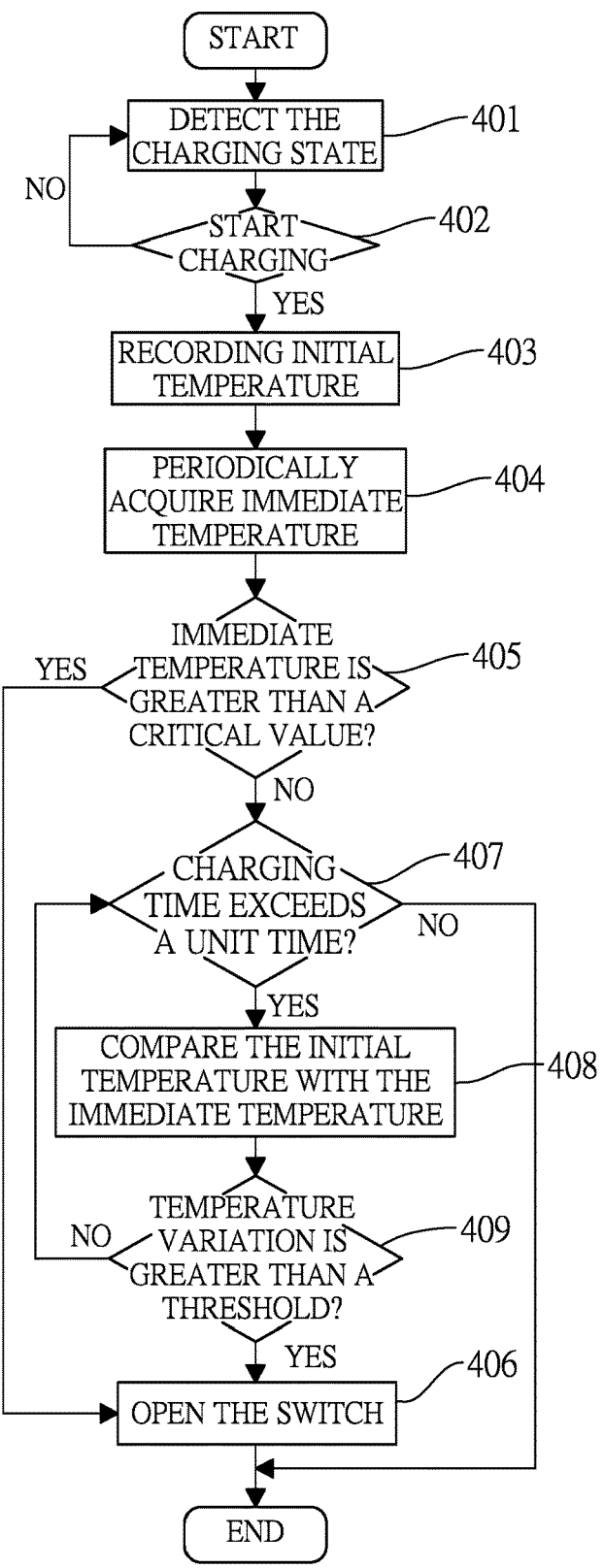
FIG. 3 is a flow chart of a charging process of the present invention.

With reference to FIG. 3, an over-temperature protection program executed by the control board 30 in the charging device 20 comprises steps of:

detecting a charging state when the charging plug 10 is connected to a power supply (401);

determining whether the charging device starts to charge the load (402), if charging is started, recording an initial temperature (temp1) (403);

periodically acquiring the immediate temperature (temp2) of the charging plug 10 (404), wherein the period for acquiring the immediate temperature may be 20 ms;

determining whether the immediate temperature (temp2) is greater than a critical value, wherein the critical value may be 80° C. (405);

if the immediate temperature (temp2) is greater than the critical value, opening the switch 21 and stopping charging (406);

if the immediate temperature (temp2) is not greater than the critical value, determining whether the charging time exceeds a unit of time, such as one hour (407), if the charging time does not exceed the unit of time, comparing the initial temperature (temp1) and the immediate temperature (temp2) (408) and calculating a temperature variation Δtemp to determine whether the temperature variation Δtemp is greater than a threshold (409);

if the temperature variation Δtemp is not greater than the threshold, returning to step (407); otherwise if the temperature variation Δtemp is greater than the threshold, opening the switch 21 to stop charging (406);

after all the steps, if there is no abnormal temperature, returning to the first step to repeat all the steps above.

What is stated above is only preferred embodiments of the present invention, which is illustrative only and not restrictive. Many changes, modifications, or the equivalents may be made by those skilled in the art without departing from the spirits and scope of the present invention as defined by the claims, but will fall within the scope of protection of the present invention.

What is claimed is:

1. An over-temperature protection system of a charging device, the system comprising:
    a temperature sensor adapted to be mounted in a charging plug to sense a temperature of the charging plug;
    a switch connected to a power circuit between the charging plug and the charging device, wherein power from the charging plug is transmitted to the charging device through the power circuit;
    a control board mounted in the charging device, the control board connected to the temperature sensor and receiving the temperature sensed by the temperature sensor, and the control board connected to the switch and controlling the switch to be open or closed;
    wherein when the charging device starts a charging operation, the control board periodically receives the temperature sensed by the temperature sensor to record an initial temperature of the charging plug, and then receives subsequent temperatures sensed by the temperature sensor at regular intervals to record a plurality of immediate temperatures; and
    wherein the control board compares the initial temperature and each of the immediate temperatures to obtain a variation of the temperature, and when the variation of the temperature of the charging plug in a unit of time is greater than a threshold, the switch is controlled to be open.

2. The over-temperature protection system as claimed in claim 1, wherein the switch is a relay having two contacts and a control terminal, and the control terminal is connected to the control board while the two contacts are respectively connected to two pins of the charging plug.

3. The over-temperature protection system as claimed in claim 1, wherein before the control board determines whether the variation of the temperature of the charging plug is greater than the threshold, the control board determines whether any one of the immediate temperatures of the charging plug is greater than a critical value, and the switch is controlled to be open when any one of the immediate temperatures is greater than the critical value.

4. The over-temperature protection system as claimed in claim 3, wherein the critical value is 80° C.

5. The over-temperature protection system as claimed in claim 3, wherein the unit of time is one hour beginning from the charging operation of the charging device.

6. The over-temperature protection system as claimed in claim 3, wherein the threshold is any temperature value selected from a range of 16 to 25° C.

7. The over-temperature protection system as claimed in claim 1, wherein each of the intervals for receiving the immediate temperature is 20 ms.

8. The over-temperature protection system as claimed in claim 2, wherein each of the intervals for receiving the immediate temperature is 20 ms.

9. The over-temperature protection system as claimed in claim 3, wherein each of the intervals for receiving the immediate temperature is 20 ms.

10. The over-temperature protection system as claimed in claim 4, wherein each of the intervals for receiving the immediate temperature is 20 ms.

11. The over-temperature protection system as claimed in claim 5, wherein each of the intervals for receiving the immediate temperature is 20 ms.

12. The over-temperature protection system as claimed in claim 6, wherein each of the intervals for receiving the immediate temperature is 20 ms.

13. The over-temperature protection system as claimed in claim 1, wherein the temperature sensor is a thermistor.

* * * * *

UNITED STATES PATENT AND TRADEMARK OFFICE
CERTIFICATE OF CORRECTION

PATENT NO. : 10,224,708 B2
APPLICATION NO. : 15/659498
DATED : March 5, 2019
INVENTOR(S) : Xue-Feng Zhang et al.

It is certified that error appears in the above-identified patent and that said Letters Patent is hereby corrected as shown below:

On the Title Page

Under Item (30) Foreign Application Priority Data, the Application number is incorrectly stated as "2017 1 0305270", the correct and full Application number is "2017 1 0305270.7"

Signed and Sealed this
Eighteenth Day of June, 2019

Andrei Iancu
*Director of the United States Patent and Trademark Office*